No. 895,931. PATENTED AUG. 11, 1908.
L. F. ADT.
EYEGLASSES.
APPLICATION FILED DEC. 9, 1905.
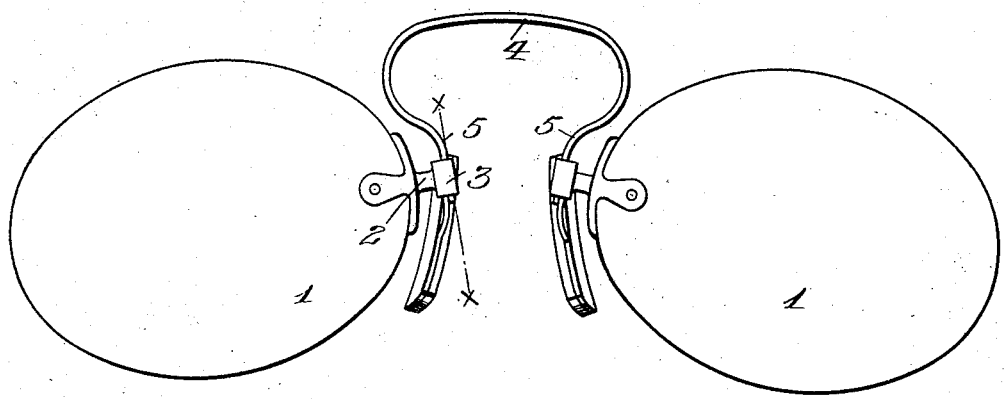
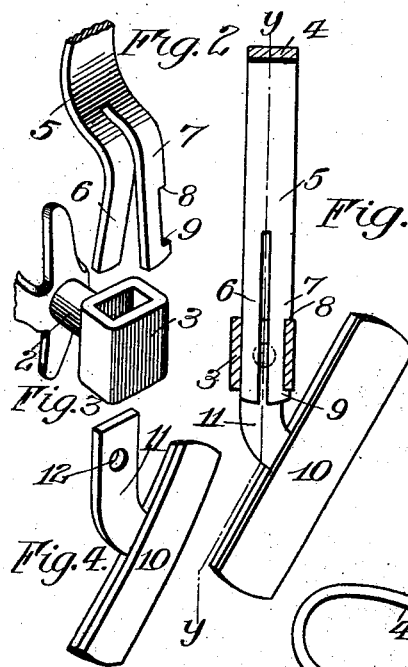 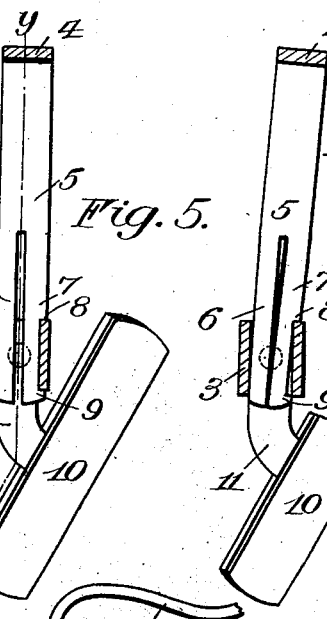 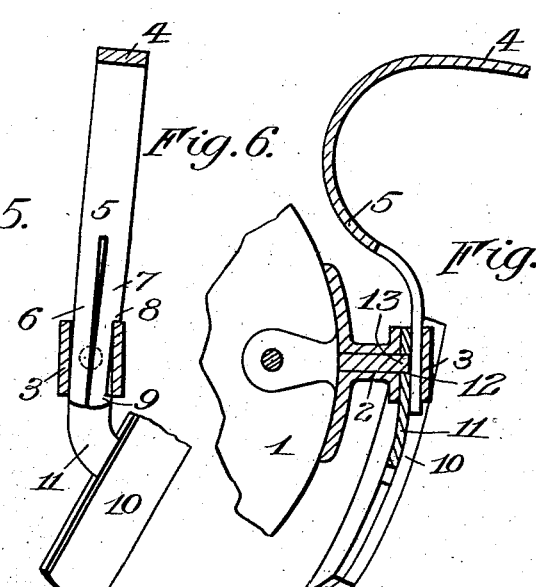
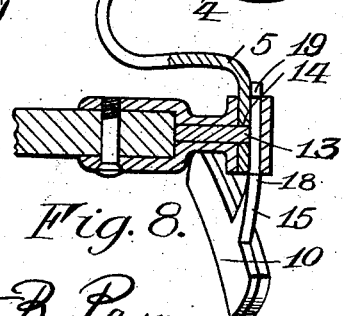 
Witnesses
Walter B. Payne
Clarence A. Bateman
Inventor
Leo F. Adt
By
Attorney

UNITED STATES PATENT OFFICE.

LEO F. ADT, OF ALBANY, NEW YORK.

EYEGLASSES.

No. 895,931.  Specification of Letters Patent.  Patented Aug. 11, 1908.

Application filed December 9, 1905. Serial No. 291,006.

*To all whom it may concern:*

Be it known that I, LEO F. ADT, of Albany, in the county of Albany, State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and has for its object to provide an improved connection between the separable parts of the mounting such as the bridge, guards, and lenses, whereby these parts may be positively and securely locked together, as well as readily detached with facility, these objects being accomplished by my present invention without the necessity of employing the usual fastening screws or parts that loosen and are otherwise objectionable, while the parts of the connection are compact and neat in appearance.

To these and other ends the invention consists in certain improvements and combinations and arrangements of parts to be hereinafter more fully described, the novel features being pointed out particularly in the claims at the end of the specification.

In the drawings:—Figure 1 is a front elevation of a pair of eyeglasses of a well-known type, having my invention applied thereto. Figs. 2, 3 and 4 show the parts of the mounting separated. Fig. 5 represents a section on the line *x*—*x* of Fig. 1, the parts being in locked position. Fig. 6 is a view similar to Fig. 4, one of the parts being tilted into unlocked position. Fig. 7 represents a section on the line *y*—*y* of Fig. 5. Fig. 8 shows a method of applying the invention to bridges having horizontal attaching portions, and Fig. 9 shows a guard having a latch member thereon.

In the several views the same numerals of reference designate similar parts.

My present invention is applicable to various forms of eyeglasses and spectacles, and the present embodiment of the invention is shown in connection with a well-known form of eyeglasses comprising the lenses 1 provided at their proximate edges with suitable attaching devices 2, each of the latter having a receptacle or box 3 thereon with apertures or seats to receive the attaching portions of the bridge and guards or equivalent parts of the mounting. The bridge in the present instance is in the form of a spring 4 having attaching portions 5 adapted to enter their respective receptacles or boxes 3 on the attaching devices, and in that form of my invention shown in Figs. 1 to 7 inclusive, these attaching portions are split lengthwise to form the separate or divided members 6 and 7 respectively both of which are adapted to enter the box, one of the said members being provided with a recess in its edge which is adapted to receive the side of the box, shoulders 8 and 9 being provided at each end of the recess to engage the opposite edges of the box and thus positively lock the spring and prevent relative movement between it and the attaching device.

The nose guards 10 having the nose-engaging portions thereon are provided preferably with the usual form of attaching portions 11 having the apertures 12 thereon, and projecting from one of the walls of the receptacle or box is a pin or projection 13, which, when the attaching portion of the guard is in fastened position will rest in the aperture thereof, the corresponding portion of the bridge resting between the end of the projection and the opposite wall of the receptacle to retain the guard attaching portion in coöperative relation with the projection.

In some cases it may be necessary or desirable to form the latch member on the guard-attaching portions instead of on the bridge or spring, the bridge or spring in some cases being narrow or otherwise, and this is accomplished by providing the bridge or spring with attaching portions having apertures 14 therein to fit over the projection 13 in the receptacle, while the guards are provided with attaching portions 15 composed preferably of spring or yielding material and are split to form the divided members 16 and 17, one of the members having a recess therein forming the shoulders 18 and 19 to coöperate with the opposite edges of the box or receptacle.

The several parts of a mounting constructed in accordance with my invention are readily assembled by inserting the attaching portion having the aperture therein within the box or receptacle and engaging the projection within the aperture, and with the said attaching portion in such a position, the attaching portion having the latch member thereon is inserted into the space left in the receptacle between the attaching portion resting therein and the opposite wall of the box, and this is permitted by the proximating of the divided members thereon. As the divided members of the latch pass into the receptacle they will be held in proximated relation until the shoulder 9 or 19 as the case may be, springs behind the corresponding edge of the receptacle, the shoulder 8 or 18 at this time coöperating with the opposite edge of the receptacle, the shoulders on the latch member thus coöperating with the receptacle to positively lock the corresponding attaching portion within the receptacle, and as the attaching portion carrying the latch is fitted snugly between the other attaching portion which is engaged on projection 13, both attaching portions will thus be securely and positively locked within the receptacle.

When it is desirable to unlock the latch and permit the parts of the mounting to be detached or separated, the attaching portion carrying the latch is tilted into a position similar to that shown in Fig. 6, and in this way the shoulder 9 or 19 will disengage with the corresponding edge of the receptacle permitting the attaching portion having the latch thereon to be withdrawn from the receptacle, and after the latch member has been removed, the attaching portion secured by the projection may be readily removed by disengaging it from the projection, the end of the projection being sufficiently spaced from the opposite wall of the receptacle to permit the passage of either attaching portion. Thus it will be seen that each part of the mounting is positively locked when in secured position, as one of the attaching portions is held from movement by engagement with the projection while the other attaching portion has a latch thereon for detachably locking it in position, and it also serves to retain the other attaching portion in coöperative relation with its projection, and unless the latch member is unlocked, neither part can be detached.

It is generally preferable to employ a closed box or receptacle such as shown, although the invention is not limited in this respect, and in cases where the attaching portions rest loosely within the box or do not completely fill the aperture thereof, the looseness may be readily taken up by bending or laterally offsetting the spring members of the latch in opposite directions, and in this way, all lost motion or looseness between the parts of the mounting is effectually prevented.

Eyeglasses or spectacles employing a connection embodying my invention are extremely neat in appearance, as the attaching portions are provided with connecting and locking devices which, when the parts are in locked position are practically invisible, and as the connection does not require the use of additional parts, a very compact and efficient construction is secured, elimination of the usual fastening screw not only improving the appearance of the mounting but removes the annoyance arising from its inevitable loosening.

The invention, while particularly applicable to the connection between the bridge and guards and the lenses, could be used for connecting other parts of the mounting where such a connection is necessary or desirable, and while in the present embodiment the attaching portions are shown as of flat material, these portions may be formed in different shapes, and the latch may be formed either integrally with one of the attaching portions, or it may be made separately and suitably attached thereto if desirable.

I claim as my invention:

1. In eyeglasses, the combination with a lens having a suitable attaching device thereon, of a mounting composed of separable parts, one of which has a detachable connection with the attaching device and another part serving to prevent detachment of the first mentioned part and having a relatively movable retaining latch arranged to coöperate with the attaching device.

2. In eyeglasses, the combination with a lens having a suitable attaching device thereon, of a mounting composed of separable parts having attaching portions adapted to coöperate with the attaching device, one of the attaching portions having a movable latch thereon to coöperate with a part of the eyeglasses to retain said attaching portion in position and serving as a lock to prevent disengagement of the other attaching portion.

3. In eyeglasses, the combination with the lenses, and suitable attaching devices therefor having a receptacle thereon, of a mounting composed of separate parts, one of the parts having means for attaching it to the attaching device, and a relatively movable latch member on a second part of the mounting serving to lock the first-mentioned part to the attaching device and also serving to lock the second part to the attaching device.

4. In eyeglasses, the combination with a lens, and a suitable attaching device therefor having a receptacle, of a spring and guard having attaching portions thereon adapted to enter the receptacle of the attaching devices, one of the attaching portions having a spring latch for detachably connecting it to the attaching device.

5. In eyeglasses, the combination with a lens, and a suitable attaching device therefor, of a spring and guard, one of the parts being detachably connected to the attaching device, the other part serving to lock the first mentioned part and having a relatively movable latch for locking itself to the attaching device.

6. In eyeglasses, the combination with a lens, and a suitable attaching device therefor having a receptacle, of a mounting embodying a bridge and guard each having an attaching portion adapted to enter the said receptacle, one of the attaching portions having a spring member thereon formed with a relatively movable latch arranged to coöperate with the attaching device to lock its corresponding attaching portion.

7. In eyeglasses, the combination with a lens, and a suitable attaching device therefor having a receptacle, of a mounting embodying a bridge and guard, a projection on the attaching device arranged to coöperate with one of the parts of the mounting to detachably connect it to the attaching device, the other part of the mounting serving to prevent the disengagement of the projection and the corresponding part of the mounting and having a relatively movable latch adapted to coöperate with the attaching device to prevent their disengagement.

8. In eyeglasses, the combination with a lens, and an attaching device therefor having a receptacle, of a bridge and guard having attaching portions adapted to rest in the said receptacle, the attaching portion of one of the parts being split to form a pair of spring members, one of said members being provided with locking shoulders arranged to coöperate with the attaching device to prevent relative longitudinal movement of the latter and the attaching portion.

9. In eyeglasses, the combination with a lens, and a suitable attaching device therefor having a box thereon, of a guard having an attaching portion adapted to rest in said box, and a spring having a split portion forming spring members adapted to rest in the box, one of the said members having a latch for locking the spring to the attaching device.

10. In eyeglasses, the combination with a lens attaching device, of a spring and a guard one of which interlocks with the attaching device and the other of which has a spring latch to engage a part of the mounting and serves to hold the first mentioned part interlocked with the lens attaching device.

11. In eyeglasses, the combination with a lens attaching device having a receptacle, and a projection extending from one of the walls of the receptacle, of a spring and a guard one of which has an aperture to receive the pin or projection, and the other of which serves to hold the pin in the aperture and has a spring latch to engage a part to lock the last named part in position.

LEO F. ADT.

Witnesses:
MICHAEL F. O'CONNOR,
EDWARD MURPHY, 2d.